United States Patent [19]

Kugo et al.

[11] Patent Number: 4,922,239
[45] Date of Patent: May 1, 1990

[54] MULTI-SHADE COLOR LIQUID CRYSTAL DISPLAY APPARATUS

[75] Inventors: Masaru Kugo, Ogawa; Hiroshi Ito, Katsuta, both of Japan

[73] Assignees: Hitachi, Ltd., Tokyo; Hitachi Automotive Engineering Co., Ltd., Katsuda, both of Japan

[21] Appl. No.: 149,478

[22] Filed: Jan. 28, 1988

[30] Foreign Application Priority Data

Feb. 2, 1987 [JP] Japan ................................. 62-20547

[51] Int. Cl.$^5$ .......................................... G09G 3/36
[52] U.S. Cl. ................................. 340/753; 340/702; 340/703; 350/339 F
[58] Field of Search ............... 340/701, 703, 702, 752, 340/753, 754, 765, 784; 350/339 F

[56] References Cited

U.S. PATENT DOCUMENTS

| | | | |
|---|---|---|---|
| 4,642,619 | 2/1987 | Togashi | 340/703 |
| 4,688,029 | 8/1987 | Kawasaki et al. | 340/753 |
| 4,736,198 | 4/1988 | Tokuyama et al. | 340/701 |

*Primary Examiner*—Gerald Brigance
*Attorney, Agent, or Firm*—Antonelli, Terry & Wands

[57] ABSTRACT

A multi-shade color liquid crystal display apparatus wherein a number of striped color liquid crystal elements are arranged in parallel in one direction. A color filter for each color liquid crystal element is arbitrarily selected to have one color and the ratios of the widths of the color filters to the pitches of the filters for each of a plurality of blocks of the striped color liquid crystal elements are made different from one another while maintaining one of the widths and pitches constant so that light and dark shades of the color are obtained in different blocks.

4 Claims, 3 Drawing Sheets

MULTI-SHADE COLOR LIQUID CRYSTAL DISPLAY APPARATUS

FIELD OF THE INVENTION

The present invention relates to a color liquid crystal display apparatus used for an instrument panel of an automobile, more particularly, this invention relates to a multi-shade color liquid crystal display apparatus which is suitable for a bar graph display.

BACKGROUND OF THE INVENTION

Recently, a liquid crystal display apparatus has been used for an instrument panel of an automobile. For changing the color tone of the instrument panel, a color display has been used in this field.

A color liquid crystal display apparatus, for instance, is disclosed in FIG. 1 of Japanese Laid-Open Patent No. 60-260921 (1985) published on Dec. 24, 1985 entitled of "Liquid Crystal Display Apparatus".

In such a conventional color liquid crystal display apparatus, no consideration has been given to making the color a lighter or darker shade.

Accordingly, in the conventional color liquid crystal display apparatus, the color of the color filter for making the color a lighter or darker shade has to be changed which results in an increase in the cost of the instrument panel.

SUMMARY OF THE INVENTION

An object of the present invention is to provide a multi-shade color liquid crystal display apparatus which is able to give sufficient light and dark shading of the color to be displayed only by using the color filter having the same shade.

The object of the present invention is attained in a multi-shade color liquid crystal display apparatus in which a number of striped color liquid crystal elements are arranged in parallel, respectively, having a predetermined pitch of each element in one direction, and by changing the ratio of the width of the color filter of each liquid crystal element and the determined pitch in each group of liquid crystal elements so as to obtain different shades of the color.

According to the present invention, even if the shade of all the color filter is same, light and dark shades of the color to be displayed appear, and light and dark shades of the displayed color of liquid crystal elements are given by changing the aperture ratios of color filters, which belong to several blocks of liquid crystal elements.

DETAILED DESCRIPTION OF THE PREFERRED EMBODIMENTS

Figure 2:
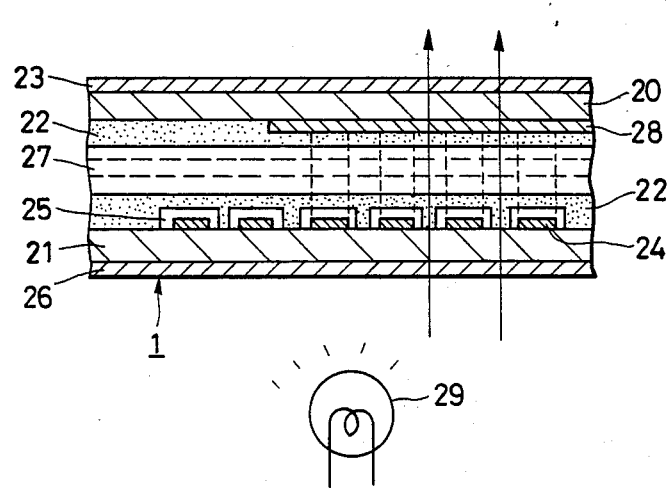
FIG. 2 shows a sectional view of one embodiment of the color liquid crystal display apparatus to which the present invention is applied.

Referring to FIG. 2, 1 denotes the whole structure of the color crystal display apparatus. 20 is an upper glass substrate, 21 a lower glass substrate, 22 an orientation film or a polarization film for polarizing liquid crystal molecules to a certain direction, 23 an upper polarizing plate, 24 striped transparent electrodes, 25 striped color filters, 26 a lower polarizing plate, 27 a liquid crystal, 28 a facing transparent electrodes, and 29 a light source.

In the layer of the orientation film 22, the minute striped transparent electrodes 24, and the minute striped color filters 25 are formed.

When a predetermined voltage is applied between the striped transparent electrodes 24 and the facing transparent electrodes 28, the liquid crystal 27 therebetween is changed in the orientation state thereof so that the light from the light source 29 is passed through the liquid crystal 27. Hereunder, the state of allowing the light to pass the liquid crystal is a lighting state, and the minimum unit which allows the lighting state is a liquid crystal element.

In the color liquid crystal display element 1, each liquid crystal element has a striped color filter 25.

Accordingly, the transmitted light passing through from the light source 29 to the liquid crystal element in the lighting state is almost a colored transmitted light through the color filter 25. The light passing through the space existing in neighboring color filters appears as a leaked transmitted light. Therefore, the color displayed mixed colors of the colored light and the leaked transmitted light.

When the light from the light source 29 is nearly a continuous spectrum, namely, a white light, the shade of the color transmitted through the liquid crystal element in the lighting state is determined by the ratio of the area of the color filter 25 in which the liquid crystal element exists in the lighting state and the area which causes the leakage transmitted light near the color filter (hereunder, leakage area). When the ratio is large, namely, when the area of the color filter to the leakage area is increased, the transmitted light is varied from the light color which is near the white light to the dark light which is determined by the characteristic of the transmitted wave length of the color filter. By changing the ratio, the shade of the color can be changed arbitrary without changing the color of the color filter used at all (incidentally, the shade of the color is called the degree of saturation).

Figure 1:
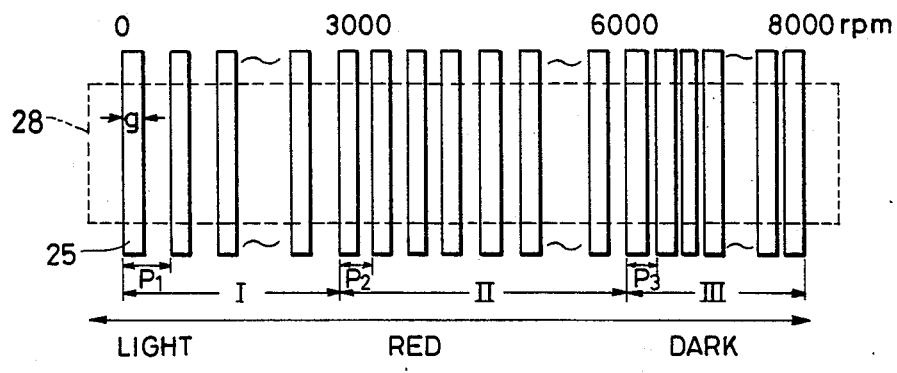
FIG. 1 shows a plan view of one embodiment of the present invention in which a color liquid crystal display apparatus thereof is applied to an engine tachometer of an instrument panel of an automobile.

Referring to FIG. 1, the variation of the shade of the color can be obtained by changing the pitches $P_1$, $P_2$, and $P_3$ of the striped color filters 25 in each block of I, II, and III corresponding to the blocks of 0–3000, 3000–6000, and 6000–8000 rpm of the revolution number of engine of the automobile, maintaining the widths g of the striped color filter 25 constant.

As well known, the bar graph type display apparatus displays desired analog values by arranging a number of unit display portions (segments) which are formed almost in rectangle. In this embodiment, the desired analog value is the revolution number of engine. Each segment is formed by a minute strip, and the segment is made of the liquid crystal element. In FIG. 1, only the striped color filters 25 are shown.

When all the widths g of the dark red striped color filters 25 used are 100 μm, the pitches $P_1$ of the striped filters 25 in the first block I is determined to be 200 μm, the pitches $P_2$ of the striped filters 25 in the second block II is determined to be 150 μm, and the pitches $P_3$ of the striped filters 25 in the third block III is determined to be 100 μm.

According to the embodiment explained above, the first block I is displayed in light red since the leakage area thereof is comparatively large, the second block II is displayed in normal red, and the third block III is displayed in dark red since the leakage area thereof becomes almost zero, without changing the color tone of the striped filters 25 at all. By inspecting the change of the color tone of the color filters 25, the appropriate degree of the revolution number of the engine can be recognized and displayed by the apparatus of the present invention by altering the color tones in the blocks I, II, and III.

According to the embodiment explained above, the blending adjustment of the color filters, which was necessary for changing the displayed color in the prior art, is not necessary at all, the alteration of the shade of color can be carried out simply, and the enrichment of the content to be displayed can be realized in a low cost.

Figure 3:
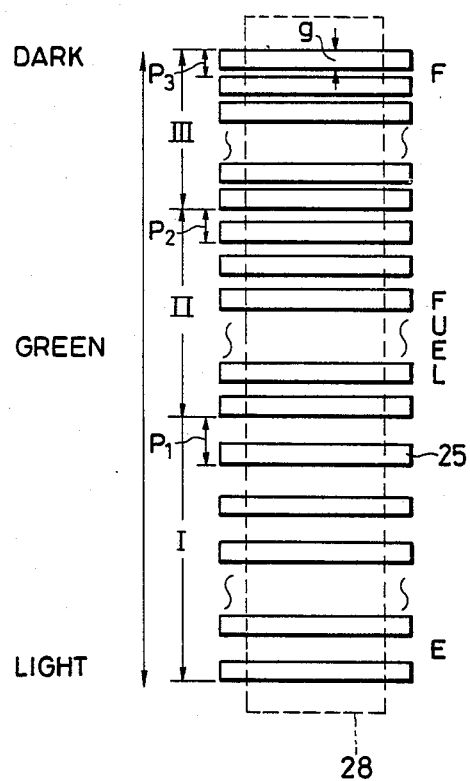
FIG. 3 shows a plan view of one embodiment to which the present invention is applied to a fuel gage.

Referring to FIG. 3, the displayed color of the fuel gage is green. The displayed direction of the bar graph is stretched from the bottom to the upper portions along the perpendicular direction thereof.

In the embodiment shown in FIG. 3, the striped color filters 25 is dark green. The pitches $P_1$, $P_2$, and $P_3$ of the filters 25 are reduced from the bottom to the upper direction of the filters 25, maintaining the same pitches in each block I, II, and III thereof.

According to the embodiment shown in FIG. 3, while the residual capacity of the fuel is large, the display apparatus 1 is displayed by dark green. When the fuel is decreased, the display is changed from dark green to light green. The image of the residual capacity can be displayed functionally and fashionably.

Figure 4:
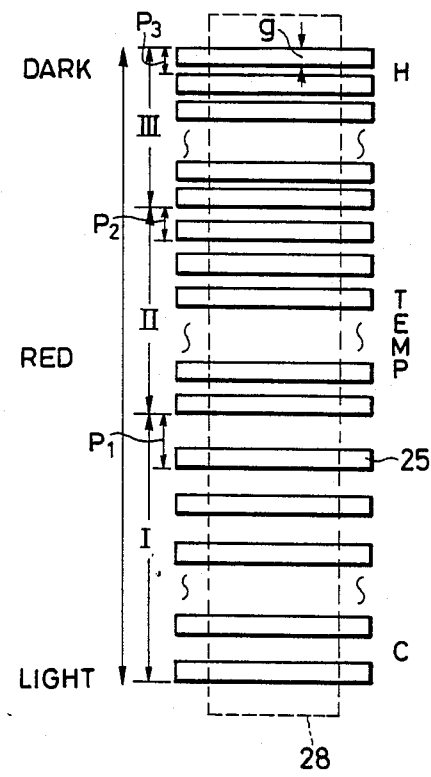
FIG. 4 shows a plan view of one embodiment to which the present invention is applied to a temperature gage.

Referring to FIG. 4, the striped color filter 25 is dark red. The pitches $P_1$, $P_2$, and $P_3$ of the filters 25 is reduced from the bottom to the upper direction of the filters 25, maintaining the same pitches in each block I, II, and III thereof as well as FIG. 3.

According to the embodiment shown in FIG. 4, while the water temperature is low, the apparatus 1 is displayed by light red. When the water temperature becomes high, the display is changed from light red to dark red, so that the water temperature is displayed in harmony with human feeling.

In the liquid crystal display apparatus, a so-called three dimensional display, in which the bar graph is displayed as a square pillar, is demanded.

Hereunder, one embodiment, in which the present invention is applied to the three dimensional display, is explained.

Figure 5:
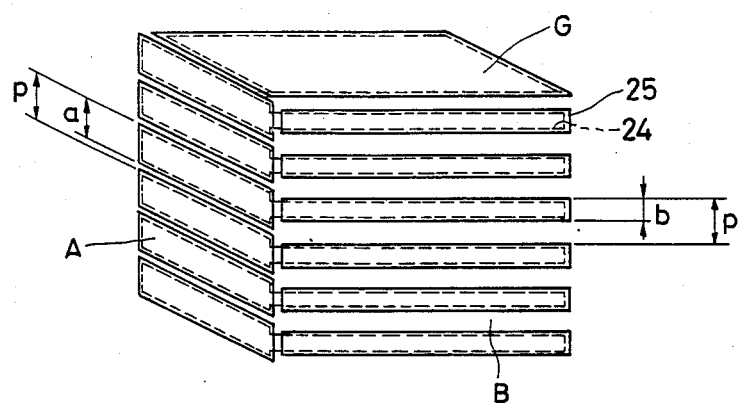
FIGS. 5, 6 and 7 show other embodiments of the color liquid crystal display apparatuses which the present invention is applied to a three-dimensional display.

Referring to FIG. 5, the striped transparent electrodes 24 is shown by the dotted lines. The striped color filters 25 is shown by the solid lines. The segments represented in three dimensions are stacked in vertical direction so that they give the passenger in the automobile a visual indication as if the segments extend and contract along the vertical direction of the display apparatus 1.

Although the three dimensional display is well known, the embodiment shown in FIG. 5 is supplied with the same shade of color in both surfaces A and B so that the three dimensional appearance is obtained. When the pitch P of the striped color filters 25 is, for instance, 120 μm in both the A and B surfaces; the width a of the striped color filters 25 on one surface A is selected to be a=100 μm, the width b of the striped color filters 25 on other surface B is selected to be b=50 μm.

As a result, according to the embodiment shown in FIG. 5, the aperture ratios of the striped color filters 25 in the A surface and the B surface are a/P, and b/P, respectively. When the liquid crystal display apparatus is lit, the A surface is displayed more darkly than the B surface, so that the display apparatus 1 has a remarkable three dimensional appearance. Since the aperture ratios of the striped color filters 25 on the A and B surfaces of the embodiment are different, when the liquid crystal display device is not lit, the color difference between the A surface and the B surface can be easily recognized and the A surface looks more dark than the B surface. The G surface also has the striped transparent electrode 24 and the striped color filter 25 as well as the A and B surfaces.

Figure 6:
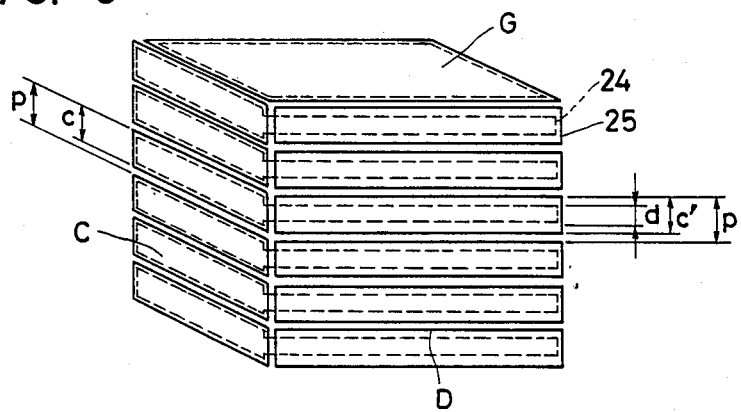

Referring to FIG. 6, another embodiment of the present invention is shown, which gives a three dimensional display.

In the embodiment shown in FIG. 6, the widths c, c' of the striped color filters 25 in the C and D surfaces are c=c'=100 μm. Namely, on the C surface, the width of the transparent electrode 24 on the C surface equals to the width c of the striped color filter 25 therein in such a manner that c=100 μm. On other surface D, the width c' of the transparent electrode 24 and the width d of the striped color filter 25 are selected to be c'>d.

In the embodiment shown in FIG. 6, since the aperture ratios c/P, c'/P of the striped color filters 25 on each surface C, and D are same, when the display apparatus 1 is not lit, the shade displayed by color on both side surfaces C and D are not different. However, since the aperture ratios c/P, c'/P of the transparent electrode 24 on the C and D surfaces are different, when the display apparatus 1 is lit, the displayed lights on both surfaces C, and D are different, the light on the D surface is displayed dark compared with the light on the C surface, so that the display apparatus 1 gives a three dimensional appearance.

Figure 7:
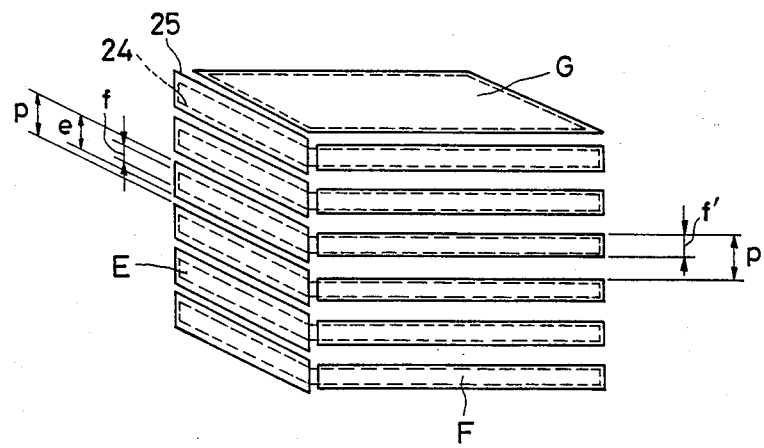

Referring to FIG. 7, the widths f, f' of the transparent electrodes 24 on the E and F surfaces are maintained to be f=f', and the widths e, f of the striped color filters 25 on the E and F surfaces are formed to be e>f. The widths of the transparent electrodes 24 and the striped color filters 25 on the F surface are nearly equal.

Accordingly, in the embodiment of FIG. 7, when the display apparatus 1 is lit, the F surface is lit by light color compared with E surface. This is because the widths of the striped color filters on the F surface is small compared with that on the E surface, so that the leaked light volume between the color filters on the F surface is large relatively compared with that on the E surface.

On the other hand, when the display apparatus 1 is not lit, the aperture ratio f'/P of the striped color filters on the F surface is smaller (namely, the interval between the filters is larger) than the aperture ratio f/P of the striped color filters on the E surface, the F surface looks light compared with the E surface, and the shade of color are different on both surfaces.

Accordingly, in the embodiments shown in FIGS. 5 to 7, although the shade of color of the striped color filters are same, the shade of color displayed on the two surfaces can be displaced with sufficient differences so that the three dimensional vision can be displayed with contrast.

Although the transparent electrodes 24 on two surfaces, for instance, A and B on each layer are connected commonly, they can be formed independently.

According to the present invention, since the shade of color can be displayed easily without adding the shade of the color to the color filters, the display of the liquid crystal display apparatus can be enriched and the three dimensional appearance can be obtained with contrast and with low cost.

What we claim is:

1. A multi-shade color liquid crystal display apparatus comprising a number of striped color liquid crystal element portions formed by striped light transparent control portions having color filters of the same predetermined color which cover the striped light transparent control portions, respectively, and which are arranged in parallel with a pitch in one direction, wherein ratios of widths of said color filters to said pitch are different in respective ones of at least two blocks of said striped color liquid crystal element portions a one of the widths of said color filters and said pitch being constant in said at least two blocks, and light and dark shades of said predetermined color to be displayed are effected by the difference in said ratios in different ones of said blocks.

2. A color liquid crystal display apparatus according to claim 1, wherein said widths of said color filters differ between said block.

3. A color liquid crystal display apparatus according to claim 1, wherein said pitch differ between said blocks.

4. A color liquid crystal display apparatus according to claim 2, wherein each block is constituted by a different ratio of the width of said strip type transparent control portion to the width of said color filter.

* * * * *